(12) United States Patent
Caramico (10) Patent No.: US 11,863,538 B2
(45) Date of Patent: Jan. 2, 2024

(54) METHODS AND SYSTEMS FOR GENERATING A SYMMETRIC KEY FOR MOBILE DEVICE ENCRYPTION

(71) Applicant: Luigi Caramico, Foster City, CA (US)

(72) Inventor: Luigi Caramico, Foster City, CA (US)

(*) Notice: Subject to any disclaimer, the term of this patent is extended or adjusted under 35 U.S.C. 154(b) by 0 days.

(21) Appl. No.: 16/232,356

(22) Filed: Dec. 26, 2018

(65) Prior Publication Data

US 2019/0222565 A1 Jul. 18, 2019

Related U.S. Application Data

(63) Continuation-in-part of application No. 14/961,791, filed on Dec. 7, 2015, now Pat. No. 10,205,599.

(60) Provisional application No. 62/088,691, filed on Dec. 8, 2014.

(51) Int. Cl.
| | |
|---|---|
| *H04L 29/06* | (2006.01) |
| *H04L 9/40* | (2022.01) |
| *H04L 9/08* | (2006.01) |
| *H04W 4/02* | (2018.01) |
| *H04W 12/03* | (2021.01) |
| *H04W 84/12* | (2009.01) |

(52) U.S. Cl.
CPC ........ *H04L 63/0435* (2013.01); *H04L 9/0861* (2013.01); *H04W 4/025* (2013.01); *H04W 12/03* (2021.01); *H04L 2463/082* (2013.01); *H04W 84/12* (2013.01)

(58) Field of Classification Search
CPC .............. H04L 63/0435; H04L 9/0861; H04L 2463/082; H04L 9/0869; H04L 63/0823; H04L 63/0853; H04L 9/0825; H04L 9/083; H04W 12/03; H04W 4/025; H04W 84/12; H04W 12/06
See application file for complete search history.

(56) References Cited

U.S. PATENT DOCUMENTS

| | | | | |
|---|---|---|---|---|
| 4,556,911 A | * | 12/1985 | Imaide ................. | H04N 25/621 348/E5.037 |
| 7,177,426 B1 | * | 2/2007 | Dube ................... | G06F 21/6209 380/46 |
| 7,412,059 B1 | * | 8/2008 | Pauker ................. | H04L 9/0825 726/1 |
| 8,090,101 B2 | * | 1/2012 | Ye .......................... | H04L 9/0875 380/47 |
| 8,312,291 B2 | * | 11/2012 | Golic ................... | G06V 40/172 713/172 |

(Continued)

OTHER PUBLICATIONS

Latif et al., "Hardware-Based Random Number Generation in Wireless Sensor Networks(WSNs)", pp. 1-9, downloaded from the Internet, URL: http://link.springer.com/content/pdf/10.1007/978-3-642-02617-1_74.pdf (Year: 2009).*

(Continued)

*Primary Examiner* — Trang T Doan (57) ABSTRACT

In one embodiment, a method of useful for generating a symmetric key includes the step of obtaining a sensor signal from a sensor of a mobile device. The method includes the step of determining one or more sampling points on said sensor signal. The method includes the step of extracting a sensor signal value at the sampling points. The method includes the step of generating the symmetric key from the sampled sensor signal value.

15 Claims, 9 Drawing Sheets

(56) References Cited

U.S. PATENT DOCUMENTS

| | | | | |
|---|---|---|---|---|
| 8,817,981 B2* | 8/2014 | Fiske | G06F 21/46 713/184 |
| 9,465,582 B1* | 10/2016 | Whelan | H04L 9/3297 |
| 9,615,199 B1* | 4/2017 | Haney | H04L 67/01 |
| 9,658,176 B2* | 5/2017 | Dai | A01C 1/00 |
| 2003/0083977 A1* | 5/2003 | Syed | G06Q 30/02 705/37 |
| 2007/0116093 A1* | 5/2007 | Karlsson | H04K 3/45 375/130 |
| 2008/0089518 A1* | 4/2008 | Reznik | H04W 12/041 380/268 |
| 2010/0199092 A1* | 8/2010 | Andrus | H04W 12/04 713/171 |
| 2013/0156181 A1* | 6/2013 | Baek | H04L 9/0875 380/44 |
| 2013/0202108 A1* | 8/2013 | Kao | H04L 9/0869 380/44 |
| 2013/0272520 A1* | 10/2013 | Noda | H04L 9/0861 380/44 |
| 2015/0093018 A1* | 4/2015 | Macciola | G06V 10/42 382/154 |
| 2015/0117646 A1* | 4/2015 | Best | H04W 12/04 380/270 |
| 2015/0163379 A1* | 6/2015 | Herzog | H04N 21/8126 348/467 |
| 2015/0355045 A1* | 12/2015 | Solomon | G01M 3/007 702/36 |
| 2016/0274256 A1* | 9/2016 | Coates | G01V 1/28 |

OTHER PUBLICATIONS

Latif et al., "Hardware-Based Random Number Generation in Wireless Sensor Networks(WSNs)", pp. 1-9, downloaded from the Internet, URL: http://ink.springer.com/content/pdf/10.1007/978-3-642-02617-1_74.pdf (Year: 2009) (Year: 2009).*

* cited by examiner

```
┌─────────────────────────────────────────────────────────────────┐
│  IMPLEMENT A PROCESS/APPLICATION IN THE THE RECIPIENT-SIDE      │
│  MOBILE DEVICE THAT PREVENTS SCREEN SHOTS, 'CUT AND PASTE'      │
│  OPERATIONS, AND/OR FORWARDING OF A DECRYPTED MESSAGE           │
│                              802                                │
└─────────────────────────────────────────────────────────────────┘
                                │
                                ▼
┌─────────────────────────────────────────────────────────────────┐
│  ACCESS THE VIDEO FEED OF A USER-FACING CAMERA ON THE MOBILE    │
│  DEVICE AND IDENTIFY VARIOUS ENTITIES IN THE USER-FACING        │
│  CAMERA'S FIELD OF VIEW                                         │
│                              804                                │
└─────────────────────────────────────────────────────────────────┘
                                │
                                ▼
┌─────────────────────────────────────────────────────────────────┐
│  IF A FACE IS NOT PRESENT, REMOVE THE MESSAGE FROM THE          │
│  MOBILE DEVICE'S DISPLAY                                        │
│                              806                                │
└─────────────────────────────────────────────────────────────────┘

METHODS AND SYSTEMS FOR GENERATING A SYMMETRIC KEY FOR MOBILE DEVICE ENCRYPTION

CLAIM OF PRIORITY AND INCORPORATION BY REFERENCE

This application claims priority from U.S. application Ser. No. 14/961,791 filed on Dec. 7, 2015, titled METHODS AND SYSTEMS OF INCREASING SECURITY QUALITY OF COMPUTING-DEVICE COMMUNICATIONS. U.S. application Ser. No. 14/961,791 claims priority from U.S. Provisional Application No. 62/088,691, titled METHODS AND SYSTEMS OF INCREASING SECURITY QUALITY OF COMPUTING-DEVICE COMMUNICATIONS and filed 8 Dec. 2014. These applications are hereby incorporated by reference in their entirety for all purposes.

BACKGROUND

1. Field

This application relates generally to encryption, and more specifically to a system, article of manufacture and method of generating a symmetric key for mobile device data encryption.

2. Related Art

Users increasing rely on electronic communications (e.g. can include digital documents, electronic messages such as electronic mail or chat messaging, etc.) to discuss important topics with other users. User may with to safeguard these communications. For example, user may want to encrypt text messages, emails, etc. In this way, third parties that may obtain the electronic messages may still not be able to access the message content. Accordingly, improves to increasing the security of a computing-device (e.g. mobile device) communications may be beneficial to users.

BRIEF SUMMARY OF THE INVENTION

In one embodiment, a method of useful for generating a symmetric key includes the step of obtaining a sensor signal from a sensor of a mobile device. The method can include the step of determining one or more sampling points on said sensor signal. The method includes the step of extracting a sensor signal value at the sampling points. The method includes the step of generating the symmetric key from the sampled sensor signal value.

BRIEF DESCRIPTION OF THE DRAWINGS

The Figures described above are a representative set, and are not exhaustive with respect to embodying the invention.

DESCRIPTION

Disclosed are a system, method, and article of manufacture for generating a symmetric key for mobile device encryption. The following description is presented to enable a person of ordinary skill in the art to make and use the various embodiments. Descriptions of specific devices, techniques, and applications are provided only as examples. Various modifications to the examples described herein can be readily apparent to those of ordinary skill in the art, and the general principles defined herein may be applied to other examples and applications without departing from the spirit and scope of the various embodiments.

Reference throughout this specification to "one embodiment," "an embodiment," 'one example,' or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, machine learning techniques, etc., to provide a thorough understanding of embodiments of the invention. One skilled in the relevant art can recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, and they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

DEFINITIONS

Key can be a piece of information (e.g. a parameter) that determines the functional output of a cryptographic algorithm and/or cipher.

Key server is a computer that receives and then serves existing cryptographic keys to users or other programs.

Mobile device can include smart phones, cell phones, personal digital assistants, tablet computers, wearable computers, smart watches, smart glasses (e.g. Google Glass®), etc.

Multifactor authentication (MFA) (e.g. two-factor authentication) can be a user authentication that utilizes the presentation of two or more independent authentication factors: a knowledge factor ("something only the user knows"), a possession factor ("something only the user has"), and an inherence factor ("something only the user is"). After presentation, each factor can be validated by the other party for authentication to occur.

Public key can be used to encrypt plaintext (as well as other types of text, images, video, audio, etc.) and/or to verify a digital signature.

Exemplary Methods

Figure 1:
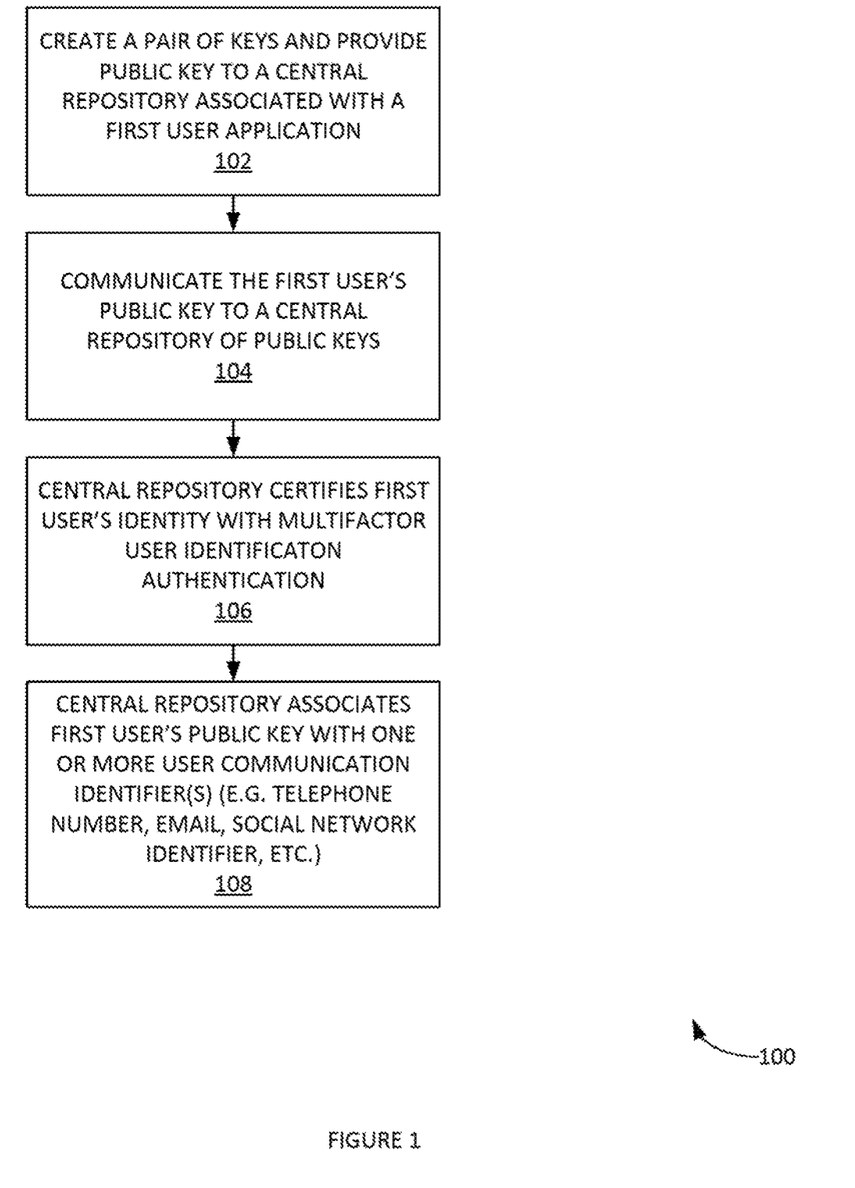
FIG. 1 illustrates an example process of creation and distribution of a public key, according to some embodiments.

FIG. 1 illustrates an example process 100 of creation and distribution of a public key, according to some embodiments. In step 102, a user can create a pair of certification or encryption keys with a mobile device application. The pair of certification keys can include a public key. In step 104, a public key of the pair of certification keys can be provided to a central repository. The central repository can be a key server. In step 106, the central repository can associate the public key with the user's mobile device application. The central repository can authenticate the user and the user's communication identifiers (e.g. the user's mobile device number, email, online social network identifier (e.g. a Facebook® profile, a Twitter® handle, etc.), and the like) with a multifactor user identification authentication. The central repository can use the communication identifier to confirm the user's identity. For example, the central repository can include a text messaging functionality that automatically generates a confirmation text message and communicates it to the user's mobile device. Alternatively, the central repository can automatically generate a confirmation email and communicate it to the user's email account.

In step 108, the central repository one or more of these communication identifiers can also be associated with the user's public key. In this way, another user's mobile device can request the public key based on an authenticated user communication identifier. For example, a second user can generate an encrypted text message for a first user's mobile device using the first user's public key as obtained from the central repository. Accordingly, the second user's mobile device can include an application that requests the first user's public key from the central repository wherein the first user's public key is identified by the first user's mobile device cellular phone number. In this way, a public key can be created and associated with a communication identifier in an accessible central repository of public keys. The central repository can certify that it has authenticated the communication identifiers associated with a particular public key. It is noted that a single public key can have n-number communication identifiers associated with it. For example, a public key can have a user's former mobile device number and new mobile device number associated with it (as well as one or more emails and/or social network identifiers). It is noted that in other example embodiments, computing devices (e.g. laptops, personal computers, etc.) can be utilized in lieu of a mobile device.

Figure 2:
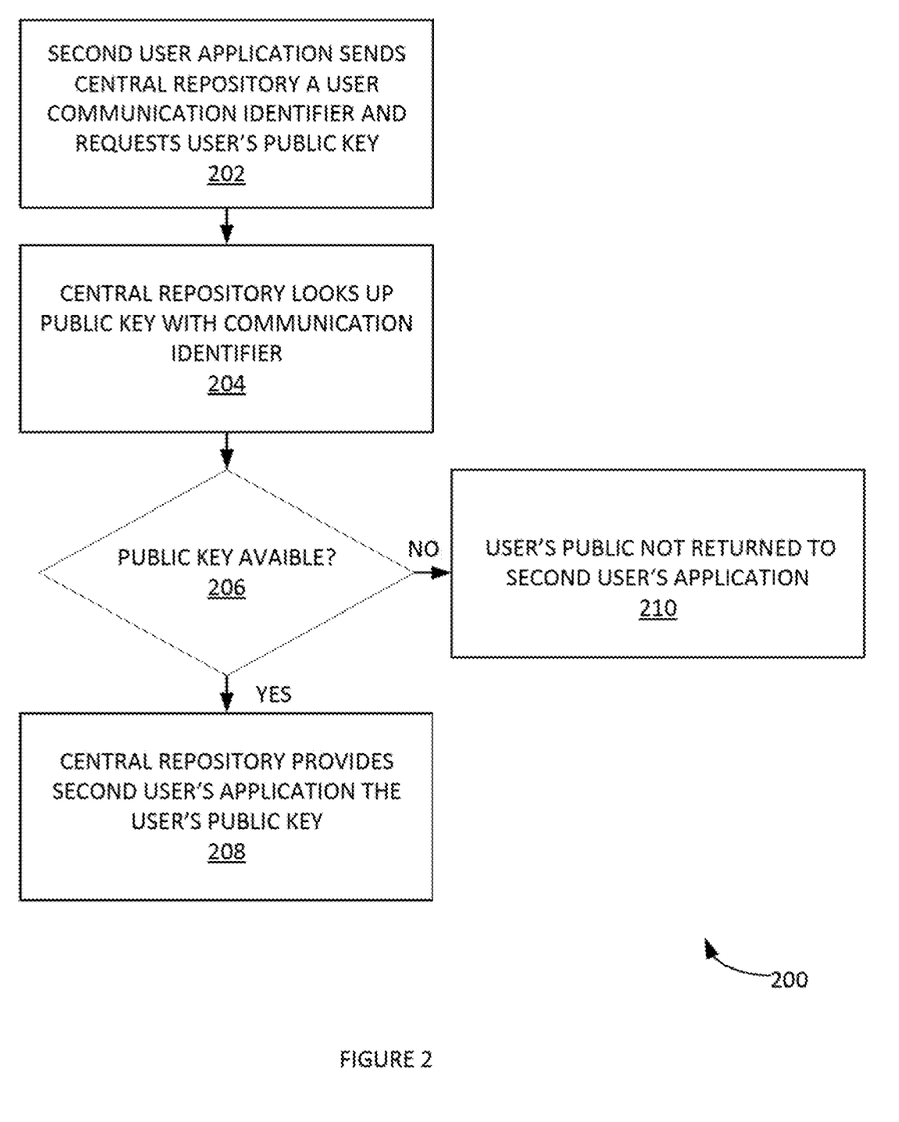
FIG. 2 illustrates an example process of a second user's application requesting a public key for a first user from the central repository, according to some embodiments.

FIG. 2 illustrates an example process 200 of a second user's application (e.g. a mobile device application) requesting a public key for a first user from the central repository, according to some embodiments. In step 202 of process 200, a second user's application can send the central repository a communication identifier and request a public key associated with said communication identifier. For example, the second user's application can be an email application that is used to send an encrypted email to a first user. The email application may need the public key of the first user to encrypt the email. The email application can have the first user's email address. The email application can send the first user's email address to the central repository with a request for the public key associated with said email address. The first user's public key (e.g. as created utilizing process 100) can then be obtained and used to encrypt the email.

In step 204, the central repository can look up the public key with the communication identifier. In step 206, it can be determined if the matching public key is available. If yes, then process 200 can proceed to step 208. In step 208, the relevant public key can be obtained and provided to the requesting second user's application. If no, then process 200 can proceed to step 70 wherein the public key is not provided to the requesting second user's application.

Figure 3:
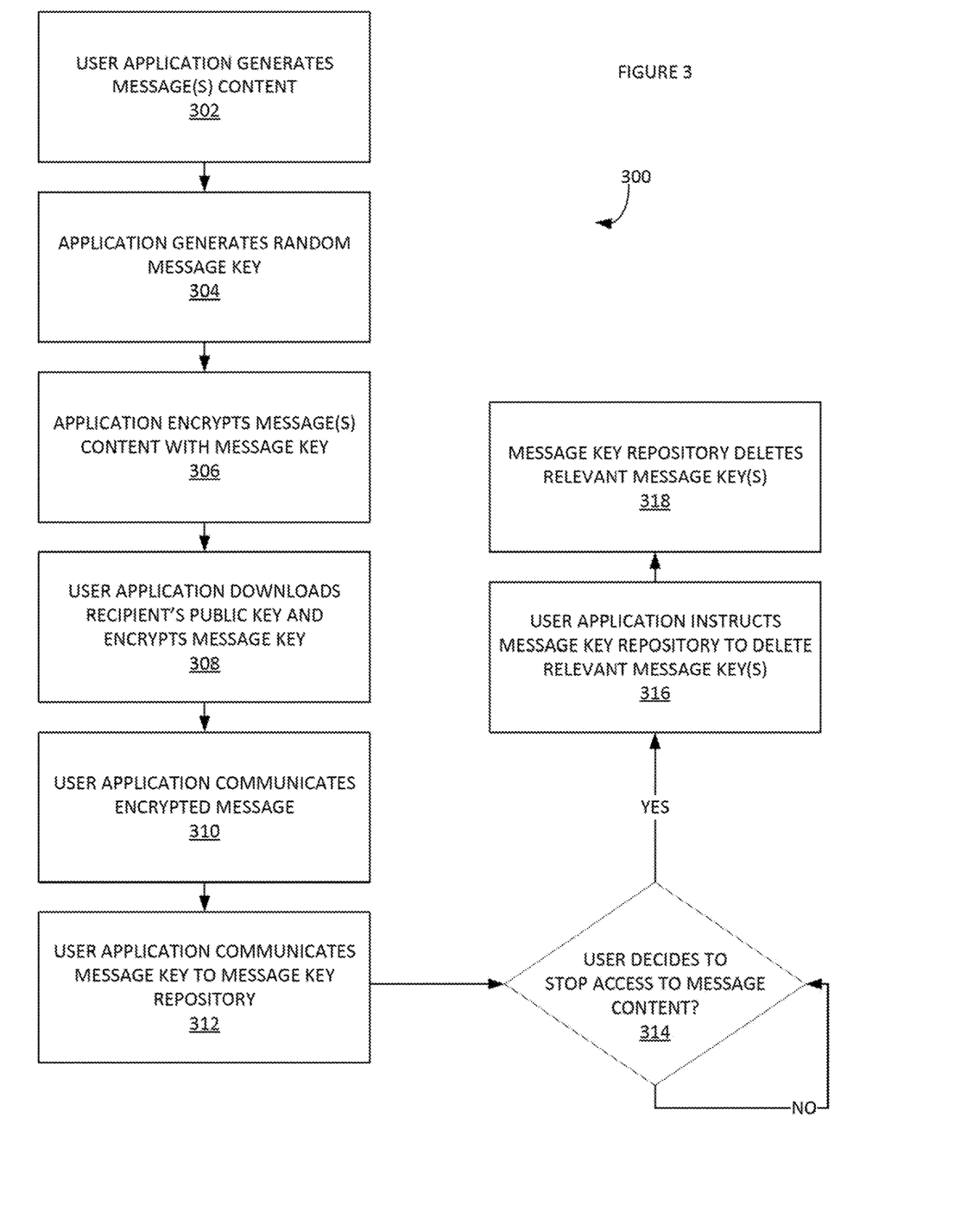
FIG. 3 illustrates a process of encrypting a message, according to some embodiments.

FIG. 3 illustrates a process 300 of encrypting a message, according to some embodiments. In step 302, a user application can generate message content. For example, a text messaging application can be used to generate a text message. An online social networking application can generate an online social network post, status update, microblog post and the like. In step 304, the user application can generate a random message key. In step 306, the application can encrypt message(s) content with message key. In step 308, the user application downloads the recipient's public key and encrypts the message(s) content. It is noted that message(s) may be a one-to-one message or a one-to-many message. The message(s) can be in a plurality of electronic messaging formats (e.g. text messages, online social networking messages, blog posts, emails, etc.). For example, a user can compose a text message and address the text message to three recipients. Accordingly, three public keys (one for each respective recipient) can be obtained from the central repository.

In step 310, user application communicates encrypted message. In step 312, the user application communicates message key to message key repository. A message key repository can be an online server that stores and manages message keys. A message key can be a key that is required to decrypt a specific message to a particular user's application (e.g. a text message to a specific user, an email to a specified set of users, etc.). The message key can be a symmetric cryptographic key. The message key can be generated using a source of high entropy for its initialization such as a random event detected by a mobile device sensor that is sampled at a randomly selected interval (see infra). When a recipient application would like to decrypt a message, the recipient can request the message key for the specific application from said message key repository. The message key and the recipient's private key can be required to decrypt the message.

In step 314, it can be determined if user decides to stop access to message content. If not, process 300 waits for user to decide to stop access to message content. If yes, process 300 can proceed to step 316. In step 316, user application instructs the message key repository to delete relevant message keys.

Figure 4:
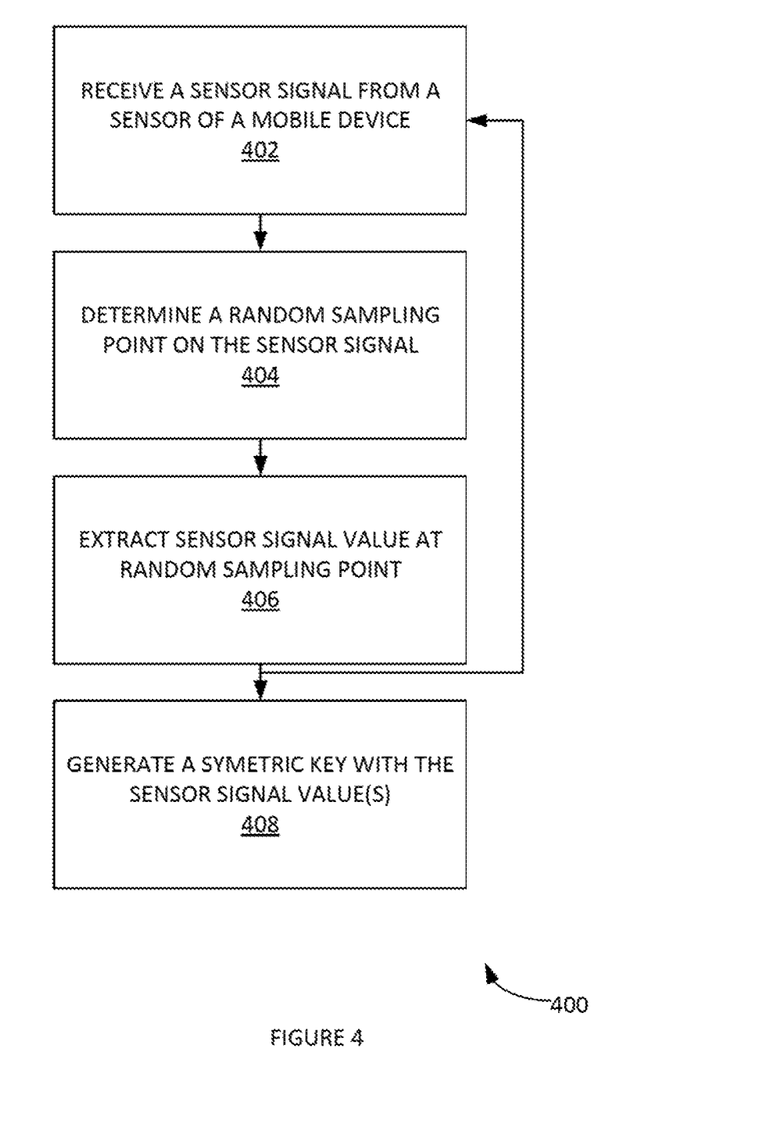
FIG. 4 illustrates an example process for generating a symmetric key, according to some embodiments

FIG. 4 illustrates an example process 400 for generating a symmetric key (e.g. a message key), according to some embodiments. In step 402 of process 400, a sensor signal can be received/obtained from a sensor of a mobile device. Example sensors that can be used include a, inter alia, microphone, digital cameras, GPS-related data (e.g. GPS signal time stamps, etc.), accelerometer; compass, gyroscope, Wi-Fi data, etc. In step 404, one or more random sampling points on said signal can be determined. A randomization algorithm can be utilized to determine one or more random sampling points. In step 406, the sensor signal value can be extracted at the random sample point(s). In step 408, a symmetric key can be generated from the sampled sensor signal value(s). It is noted that multiple sensor signal values can be obtained by repeating one or more steps of process 400. Additionally, a combination of different sensors can be utilized in some example embodiments (e.g. accelerometer data can be combined with microphone data, etc.). Various symmetric key generation processes can be utilized to generate the symmetric from the sensor sampling value.

Exemplary Systems and Computer Architecture

Figure 5:
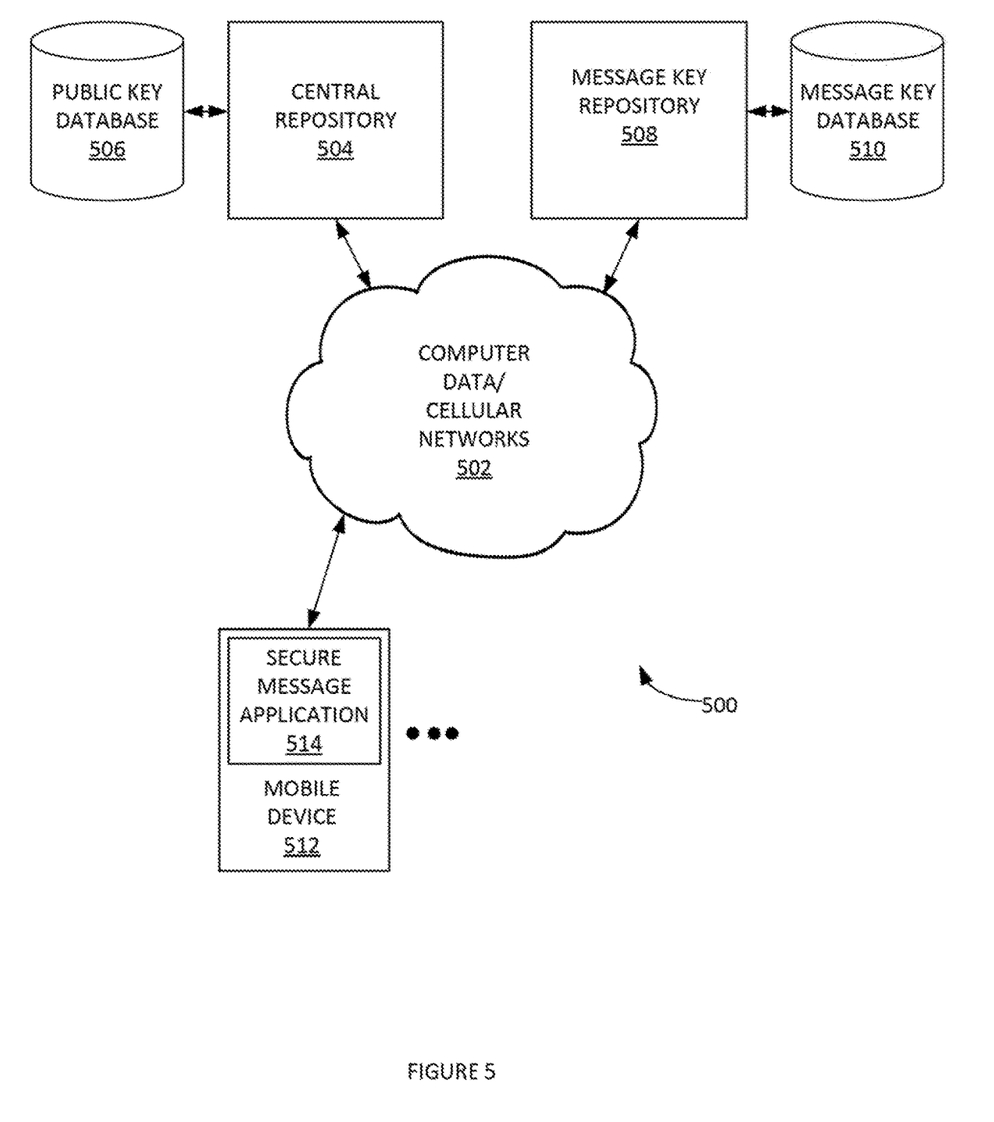
FIG. 5 depicts, in block diagram format, an example system for increasing message security, according to some embodiments.

FIG. 5 depicts, in block diagram format, an example system 500 for increasing message security, according to some embodiments. System 500 entities communicate electronic messages via various computer and/or cellular data networks 502 (e.g. the Internet, etc.). System 500 can include a central repository 504. Central repository 504 can be implemented as a server and/or in a cloud-computing environment. Central repository 504 can receive a public key, such as a public key generated by secure message application 514. Central repository 504 can include a functionality for automatically authenticating the public key and/or a user of mobile device 512. Central repository 504 can utilize a user's communication identifiers (e.g. the user's mobile device number; email, online social network identifier (e.g. a Facebook® profile, a Twitter® handle, etc.), and the like) in the user authentication process. Central repository 504 can store various public key, authentication data (e.g. a cellular phone number of mobile device 512, an email address, an IP address of mobile device 512, etc.) and other related information to public key database 506. Central repository 504 can include an application programming interface (API) for interacting with secure message application 514, as well as, other computer applications (e.g. message key repository 508, etc.). Central repository 504 can receive queries from other applications for the public key associated with secure message application 514. The queries can include communication identifiers associated with mobile device 512 and/or a user of mobile device 512. Central repository 504 can identify the relevant public key and communicate it to the requesting mobile device and/or other computer application.

Secure message application 514 can generate public keys, private keys and symmetric keys (e.g. message keys). Secure message application 514 can implement various recipient-side mobile device message security protocols (e.g. such as those provided supra) when mobile device 512 receives secure messages from other mobile devices in system 500. For example, secure message application 514 can prevent cut and paste operations, screen shots, pictures of the displayed image of the secured message, etc.

Figure 6:
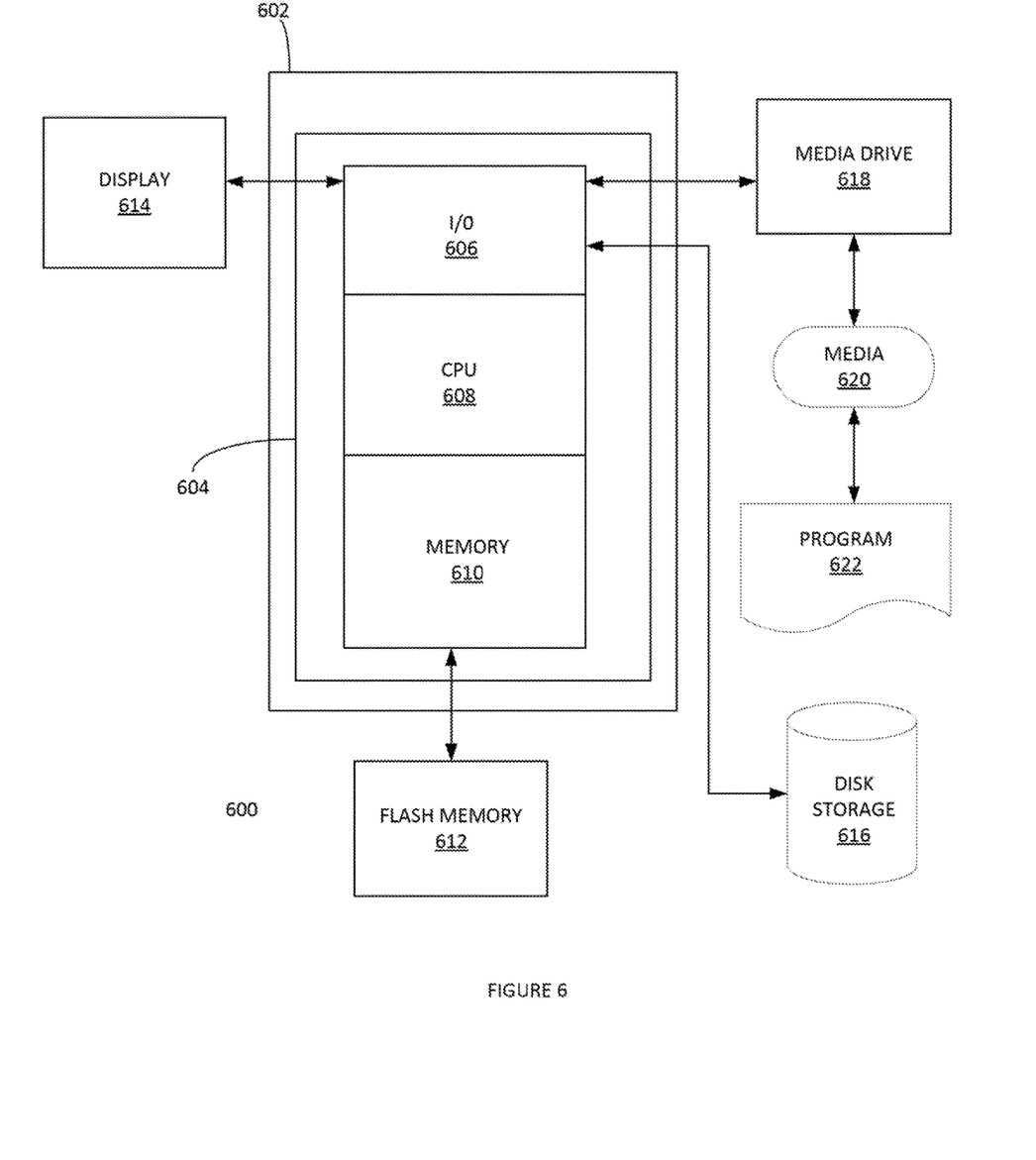
FIG. 6 depicts a computing system with a number of components that may be used to perform any of the processes described herein.

FIG. 6 depicts an example computing system 600 that can be configured to perform any one of the processes provided herein. In this context, computing system 600 may include, for example, a processor, memory, storage, and I/O devices (e.g., monitor, keyboard, disk drive, Internet connection, etc.). However, computing system 600 may include circuitry or other specialized hardware for carrying out some or all aspects of the processes. In some operational settings, computing system 600 may be configured as a system that includes one or more units, each of which is configured to carry out some aspects of the processes either in software, hardware, or some combination thereof.

FIG. 6 depicts computing system 600 with a number of components that may be used to perform any of the processes described herein. The main system 602 includes a motherboard 604 having an I/O section 606, one or more central processing units (CPU) 608, and a memory section 610, which may have a flash memory card 612 related to it. The I/O section 606 can be connected to a display 614, a keyboard and/or other user input (not shown), a disk storage unit 616, and a media drive unit 618. The media drive unit 618 can read/write a computer-readable medium 620, which can contain programs 622 and/or data. Computing system 600 can include a web browser. Moreover, it is noted that computing system 600 can be configured to include additional systems in order to fulfill various functionalities. Computing system 600 can communicate with other computing devices based on various computer communication protocols such a Wi-Fi protocols, Bluetooth® (and/or other standards for exchanging data over short distances includes those using short-wavelength radio transmission), cellular data network protocols, short messaging system protocols, TCP/HTTP protocols, etc.

Figure 7:
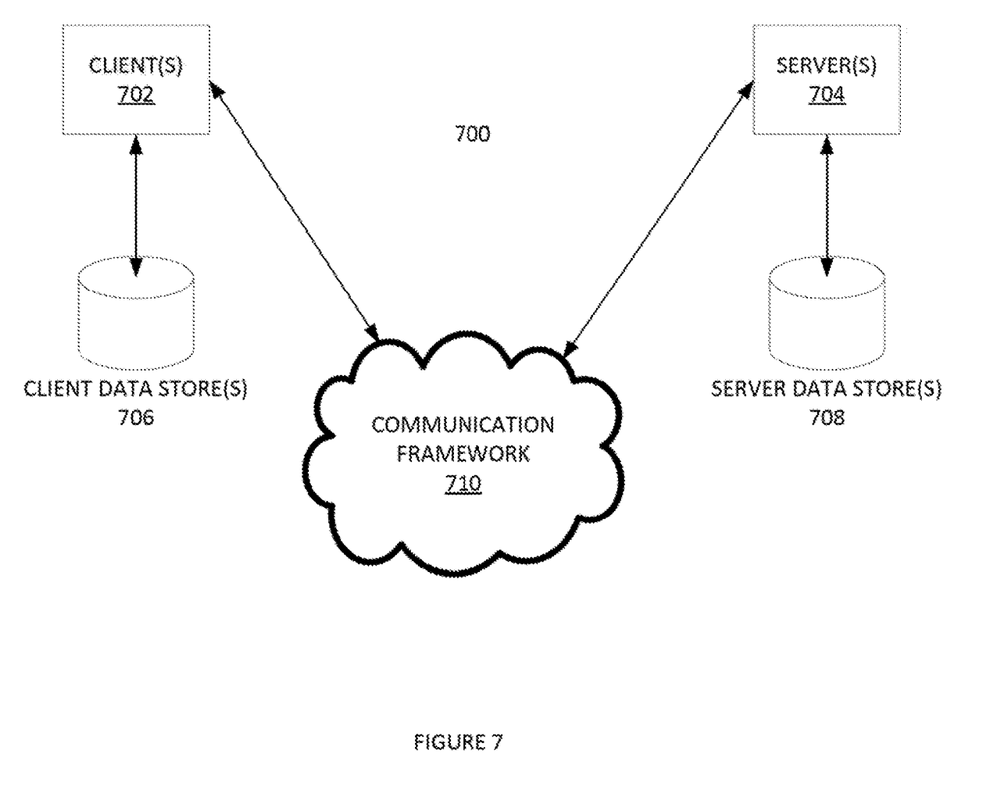
FIG. 7 is a block diagram of a sample-computing environment that can be utilized to implement some embodiments.

FIG. 7 is a block diagram of a sample computing environment 700 that can be utilized to implement some embodiments. The system 700 further illustrates a system that includes one or more client(s) 702. The client(s) 702 can be hardware and/or software (e.g., threads, processes, computing devices). The system 700 also includes one or more server(s) 704. The server(s) 704 can also be hardware and/or software (e.g., threads, processes, computing devices). One possible communication between a client 702 and a server 704 may be in the form of a data packet adapted to be transmitted between two or more computer processes. The system 700 includes a communication framework 710 that can be employed to facilitate communications between the client(s) 702 and the server(s) 704. The client(s) 702 are connected to one or more client data store(s) 706 that can be employed to store information local to the client(s) 702. Similarly, the server(s) 704 are connected to one or more server data store(s) 708 that can be employed to store information local to the server(s) 704.

Figure 8:
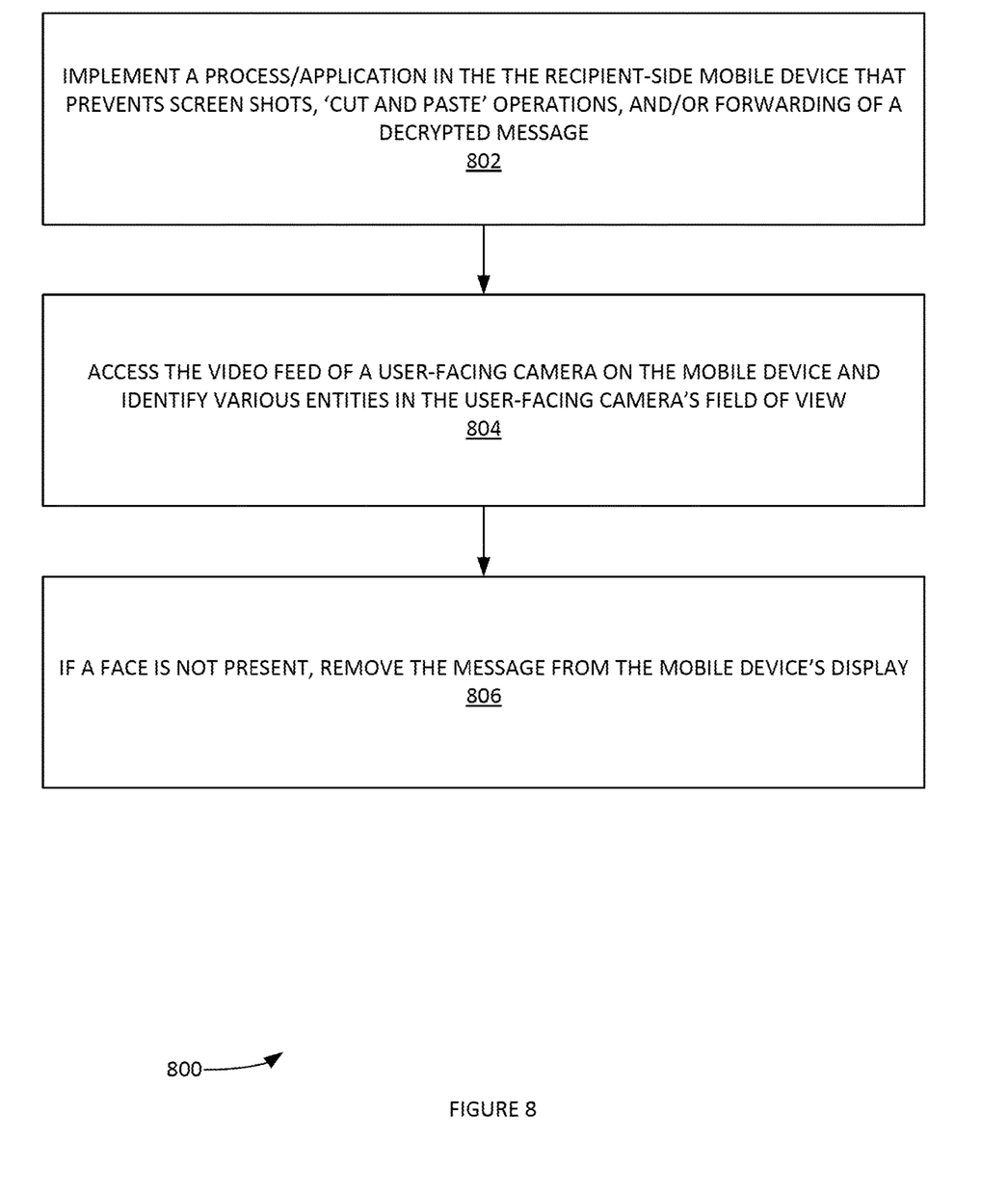
FIG. 8 illustrates an example process of various safe guards that can be implemented on a receiving user's mobile device to prevent unauthorized viewing, copying and/or forwarding of a message, according to some embodiments.

FIG. 8 illustrates an example process 800 of various safe guards that can be implemented on a receiving user's mobile device to prevent unauthorized viewing, copying and/or forwarding of a message, according to some embodiments. In step 802, a process/application can be implemented in the recipient-side mobile device that prevents screen shots, 'cut and paste' operations, and/or forwarding of a decrypted message. Furthermore, in step 804, the application can access the video feed of a user-facing camera on the mobile device. The feed can be analyzed to identify various entities in the user-facing camera's field of view. In one example, a facial detection algorithm can be used to determine if a face is present (or if a percentage of a face is present). In step 806, if a face is not present, the application can remove the message from the mobile device's display. In another example, step 806 can optionally include an object identification algorithm can be used to determine if another camera is facing the mobile device's display. If another camera is detected, then the application can remove the message from the mobile device's display.

It is noted that, in some embodiments, the key repository (e.g. operating in a central repository server) and its associated methods/processes (e.g. as provided supra) can be integrated into third-party infrastructures to secure the messages and/or contents in order to add a new layer of security and of sharing control on those infrastructures. For example, the key repository (e.g. operating in a central repository server) and its associated methods/processes can be utilized in a text messaging system to add an additional layer of security to the text messages exchanged between users.

It is noted that, in some embodiments, the processes and/or systems provided supra can be used to mutually authenticate two (2) computing devices (e.g. mobile devices, etc.). Accordingly, the processes and/or systems provided supra can be the guarantor of the identity of the devices. For example, the processes and/or systems provided supra can be utilized in securing signing electronic documents, signing electronic contracts, executing financial transactions in a digital format. The processes and/or systems provided supra can be used to guarantee that the transaction was executed by a particular device (e.g. by using bio-metric authentication to verify the identity of the signer, etc.). This information can then be used to ensure later non-repudiation of the various electronic documents, signatures, legal obligations, etc.

It is noted that, in some embodiments, a message (e.g. an electronic message) can be a text message (e.g. SMS, MMS, etc.), a voice-phone call, a word document, voice message, image, a virtual-reality message, etc.

Figure 9:
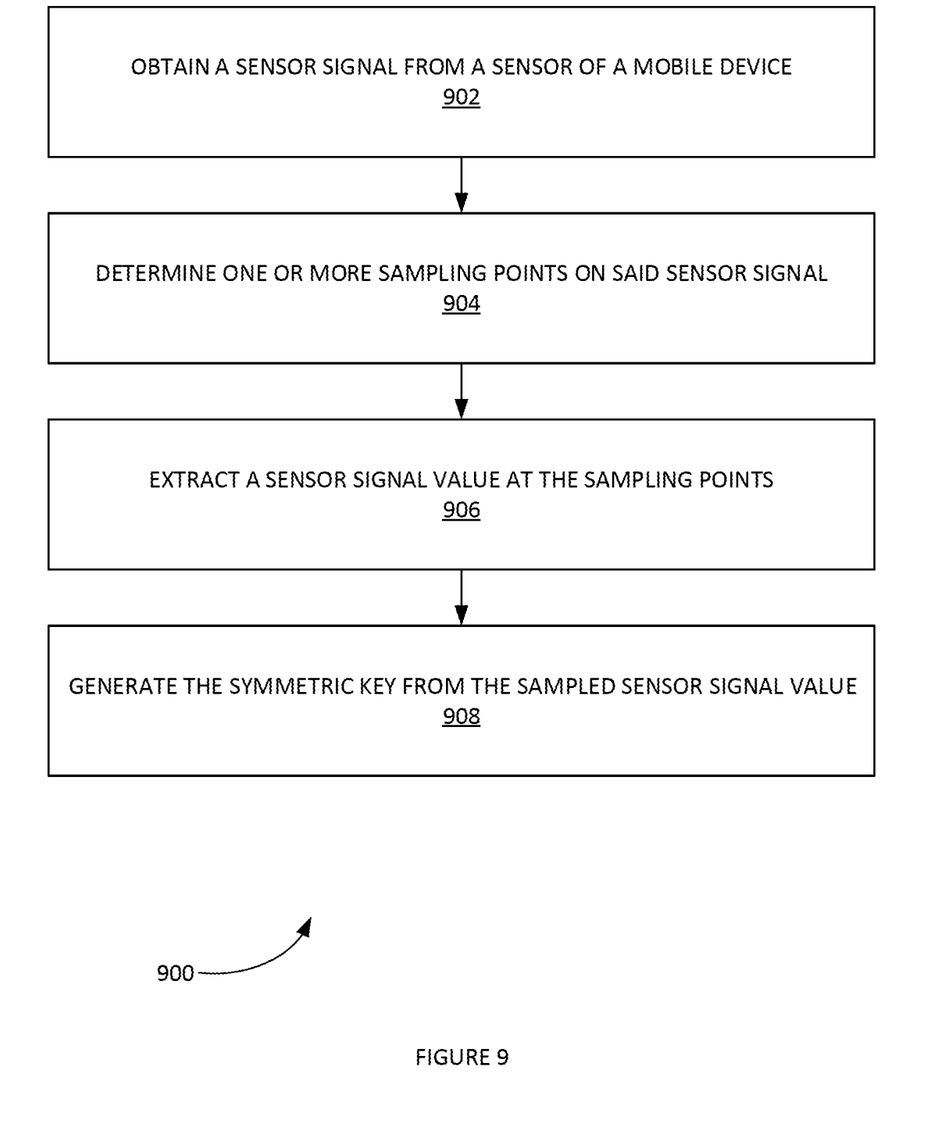
FIG. 9 illustrates an example process for generating a symmetric key, according to some embodiments.

FIG. 9 illustrates an example process 900 for generating a symmetric key, according to some embodiments. In step 902, process 900 can obtain a sensor signal from a sensor. In step 904, process 900 can determine one or more sampling points on said sensor signal. In step 906, process 900 can extract a sensor signal value at the sampling points. the sampling points of the sensor signal are randomly selected. In step 908, process 900 can generate the symmetric key from the sampled sensor signal value.

In one example, the sampling points are specified based on a type of sensor. In one example, the sensor signal value can be the signal strength of WIFI or CELL signal or BLUETOOTH® signal, as well as, any data signal on those protocols. The sampling points can be set at a specified vertical sample rate of the sensor signal or a specified horizontal sample rate of the sensor signal. The sampling points can be set at a specified range at the beginning of the sensor signal.

CONCLUSION

Although the present embodiments have been described with reference to specific example embodiments, various modifications and changes can be made to these embodiments without departing from the broader spirit and scope of the various embodiments. For example, the various devices, modules, etc. described herein can be enabled and operated using hardware circuitry, firmware, software or any combination of hardware, firmware, and software (e.g., embodied in a machine-readable medium).

In addition, it can be appreciated that the various operations, processes, and methods disclosed herein can be embodied in a machine-readable medium and/or a machine accessible medium compatible with a data processing system (e.g., a computer system), and can be performed in any order (e.g., including using means for achieving the various operations). Accordingly, the specification and drawings are to be regarded in an illustrative rather than a restrictive sense. In some embodiments, the machine-readable medium can be a non-transitory form of machine-readable medium.

What is claimed is:

1. A method of useful for generating a symmetric key comprising:
    with a processor of a mobile device,
        obtaining a sensor signal from a sensor;
        determining one or more random sampling points on the sensor signal with a randomization algorithm, wherein the sensor comprises a global positioning system (GPS)-related data from the mobile device, wherein the sensor signal comprises one or more GPS signal time stamps, wherein the GPS-related data comprises a GPS signal time stamp;
        extracting a sensor signal value of the one or more GPS signal time stamps at the one or more sampling points, and wherein the one or more sampling points of the sensor signal are randomly selected by the randomization algorithm;
        determining one or more random sampling points on the sensor signal with a randomization algorithm,
        obtaining another sensor signal, wherein the other sensor signal comprises a short-wavelength radio transmission signal;
        extracting another sensor signal value at another set of sampling points of the other sensor signal, wherein the other sensor signal value comprises a signal strength of the other sensor signal;
        generating the symmetric key from a sampled sensor signal value of the one or more GPS signal time stamps and the other sensor signal value; and
        encrypting an electronic message generated with the mobile device with the symmetric key.

2. The computer-implemented method of claim 1, wherein the sensor is a mobile-device sensor.

3. The computer-implemented method of claim 2, wherein the one or more sampling points are specified based on a type of sensor.

4. The computer-implemented method of claim 3, wherein the one or more sampling points are set at a specified vertical sample rate of the sensor signal or a specified horizontal sample rate of the sensor signal.

5. The computer-implemented method of claim 3, wherein the one or more sampling points are set at a specified range at the beginning of the sensor signal.

6. The computer-implemented method of claim 2, wherein the sensor comprises a specified sample of microphone data from the mobile device.

7. The computer-implemented method of claim 2, wherein the sensor comprises a specified sample of digital camera data from the mobile device.

8. The computer-implemented method of claim 2, wherein the sensor comprises a specified sample of accelerometer data from the mobile device.

9. The computer-implemented method of claim 2, wherein the sensor comprises a specified sample of digital compass data from the mobile device.

10. The computer-implemented method of claim 2, wherein the sensor comprises a specified sample of gyroscope data from the mobile device.

11. The computer-implemented method of claim 2, wherein the sensor comprises a specified sample of Wi-Fi data from the mobile device.

12. The computer-implemented method of claim 2, wherein the symmetric key comprises a message key.

13. The computer-implemented method of claim 1, wherein a randomization algorithm is utilized to determine one or more random sampling points.

14. The computer-implemented method of claim 1 further comprising:
   one or more random sampling points on said signal are determined from a specified vertical sample interval of the sensor; and
   one or more random sampling points on said signal are determined from a specified horizontal sample interval of the sensor.

15. A computerized system useful for generating a symmetric key, comprising:
   at least one processor configured to execute instructions;
   a memory containing instructions when executed on the processor, causes the at least one processor to perform operations that:
      obtain a sensor signal from a sensor of a mobile device;
      determine one or more sampling points on said sensor signal with a randomization algorithm, wherein the sensor comprises a global positioning system (GPS)-related data from the mobile device, wherein the sensor signal comprises one or more GPS signal time stamps;
      extract a sensor signal value at one or more sampling points, and wherein the one or more sampling points of the sensor signal are randomly selected;
      obtain another sensor signal from another type sensor, wherein the other sensor signal comprises a short-wavelength radio transmission signal;
      extract another sensor signal value at another set of sampling points of the other sensor signal, wherein the other sensor signal value comprises a signal strength of the other sensor signal;
      generate the symmetric key from one or more sampled sensor signal value and the other sensor signal value of the other type sensor; and
      encrypting an electronic message generated with the mobile device with the symmetric key.

* * * * *